(12) United States Patent
Zhang

(10) Patent No.: US 11,230,342 B2
(45) Date of Patent: Jan. 25, 2022

(54) SENSING-ENABLED AUTOMATICALLY FOLDABLE SCOOTER FRAME

(71) Applicant: DONGGUAN PRESTIGE SPORTING PRODUCTS CO., LTD., Dongguan (CN)

(72) Inventor: Zhao Zhang, Dongguan (CN)

(73) Assignee: DONGGUAN PRESTIGE SPORTING PRODUCTS CO., LTD., Dongguan (CN)

( * ) Notice: Subject to any disclaimer, the term of this patent is extended or adjusted under 35 U.S.C. 154(b) by 286 days.

(21) Appl. No.: 16/497,181

(22) PCT Filed: Aug. 1, 2017

(86) PCT No.: PCT/CN2017/095408
§ 371 (c)(1),
(2) Date: Sep. 24, 2019

(87) PCT Pub. No.: WO2018/176708
PCT Pub. Date: Oct. 4, 2018

(65) Prior Publication Data
US 2020/0017159 A1 Jan. 16, 2020

(30) Foreign Application Priority Data

Mar. 27, 2017 (CN) .......................... 201720306895.0

(51) Int. Cl.
*B62K 15/00* (2006.01)
*B62K 5/003* (2013.01)
(Continued)

(52) U.S. Cl.
CPC ............... *B62K 15/00* (2013.01); *B62J 45/41* (2020.02); *B62J 45/42* (2020.02); *B62K 5/003* (2013.01); *B62K 15/006* (2013.01); *B62K 23/00* (2013.01)

(58) Field of Classification Search
CPC .... A61G 5/085; A61G 5/0833; A61G 5/0883; B62K 5/003; B62K 5/007
(Continued)

(56) References Cited

U.S. PATENT DOCUMENTS 9,265,675 B2 * 2/2016 Ransenberg ........... B62K 5/025
9,428,065 B2 * 8/2016 Lee .......................... B60T 7/102
10,773,767 B2 * 9/2020 Zhang .................. B62K 15/008

FOREIGN PATENT DOCUMENTS

CN          2744589 Y      12/2005
CN      103158819 A   *   6/2013
(Continued)

*Primary Examiner* — Minnah L Seoh
*Assistant Examiner* — Hosam Shabara
(74) *Attorney, Agent, or Firm* — Shimokaji IP

(57) ABSTRACT

A sensing-enabled automatically foldable scooter frame includes a support frame, a seat, an electric pushrod, a sensor, a controller, and an operating member. The electric pushrod is provided at the support frame to drive folding and unfolding of the support frame. The sensor is provided at a surface of the seat. The controller receives a signal from the sensor to control extension or retraction of the electric pushrod. The operating member is electrically connected to the controller. The operating member is disabled when the sensor detects existence of pressure, and the controller controls the electric pushrod in a retracted state, thereby ensuring the support frame in an unfolded state. The operating member is enabled when no pressure is detected, and the controller drives folding or unfolding of the support frame. The present invention can prevent a scooter frame from being folded accidentally, thereby protecting a user from being hurt.

4 Claims, 3 Drawing Sheets

(51) Int. Cl.
　　　*B62K 23/00*　　　(2006.01)
　　　*B62J 45/41*　　　(2020.01)
　　　*B62J 45/42*　　　(2020.01)
(58) Field of Classification Search
　　　USPC .......................................................... 280/208
　　　See application file for complete search history.

(56) References Cited

FOREIGN PATENT DOCUMENTS

| | | | | | |
|---|---|---|---|---|---|
| GB | 2397810 | A | * | 8/2004 | ........... A61G 5/0858 |
| GN | 103158819 | A | | 6/2013 | |
| GN | 202965998 | U | | 6/2013 | |
| GN | 106184549 | A | | 12/2016 | |
| WO | WO-2006084571 | A1 | * | 8/2006 | ........... A61G 5/1054 |
| WO | 2016044987 | A1 | | 3/2016 | |

* cited by examiner

SENSING-ENABLED AUTOMATICALLY FOLDABLE SCOOTER FRAME

FIELD OF THE INVENTION

The present invention relates to a foldable scooter frame, and more particularly to a sensing-enabled automatically foldable scooter frame.

BACKGROUND OF THE INVENTION

Currently, the existing folding electric scooters are generally folded by manually folding or automatically folding. For the manually folding scooter, various rods and mechanisms of a scooter frame are designed by linkage, and user folds the scooter only by simple operation, and it is easy to use. However, for people with certain disabilities, manual folding also requires a lot of effort, so it is inconvenience to use for those with certain disabilities. For the automatically folding scooter, the scooter is folded by driving the scooter frame by a drive device on the scooter. Although it does not need to be folded by hand, it only needs to press a button to fold the scooter, and it is simple to use. Since the button is set on the scooter frame, it is prone to error. As a result, the operation causes accidental folding when a user is still in the scooter, resulting in pinching the user. Therefore, the existing automatically folding scooter and is inconvenient to use.

SUMMARY OF THE INVENTION

One objective of the present invention is to provide a sensing-enabled automatically foldable scooter frame that prevents accidentally folding the scooter frame and avoids pinching a user to protect the user.

To achieve the above-mentioned objective, the present invention provides a sensing-enabled automatically foldable scooter frame which includes a support frame, a seat, an electric pushrod, a sensor, a controller, and an operation device. Specifically, the seat is disposed on the support frame, and the electric pushrod is arranged on the support frame for driving the support frame to fold or unfold. Furthermore, the operation device is electrically connected to the controller, the sensor is disposed on a surface of the seat for detecting pressure on the surface of the seat, and the controller is arranged to receive a signal from the sensor so as to control the electric pushrod to extend or retract. When the sensor detects pressure on the surface of the seat, the operation device stops working, and the controller controls the electric pushrod to always remain in a retracted state, thereby ensuring the scooter frame to remain in an unfolded state. When no pressure on the surface of the seat is detected by the sensor detects, the operation device is enabled, and the controller drives the electric pushrod to extend or retract by the operation device, thereby driving the scooter frame to be folded or unfolded.

In comparison with the prior art, the sensor is disposed on a surface of the seat for detecting pressure on the surface of the seat, and the sensor is electrically connected to the controller. The sensor detects whether someone sits in the seat. When the seat is seated, pressure signal from the surface on the seat will be fed back to the controller, and then the controller can keep the electric pushrod in a retracted state. In this process, the operation device is disabled, thereby preventing accidentally folding the scooter frame and avoiding pinching a user. When the seat is not seated, and no pressure on the surface of the seat is detected by the sensor, another pressure signal is fed back to the controller, so that the operation device is enabled and the electric pushrod can be controlled by the operation device to drive the scooter frame to be folded or unfolded, which is easy to use and safe.

Preferably, the scooter frame includes three sensors, one of which is disposed on the front region of the surface of the seat, and the other two are respectively disposed on the left and right regions of the surface of the seat.

Specifically, any one of three sensors that detects pressure can make the controller to control the electric pushrod.

Preferably, the operation device is a manual switch.

Preferably, the operation device is a remote operation device including a remote control transmitter and a remote control receiver electrically connected to the controller, and the remote control receiver receives an instruction from the remote control transmitter and controls the electric pushrod to start and stop.

DETAILED DESCRIPTION OF ILLUSTRATED EMBODIMENTS

A distinct and full description of the technical solution of the present invention will follow by combining with the accompanying drawings.

Figure 1:
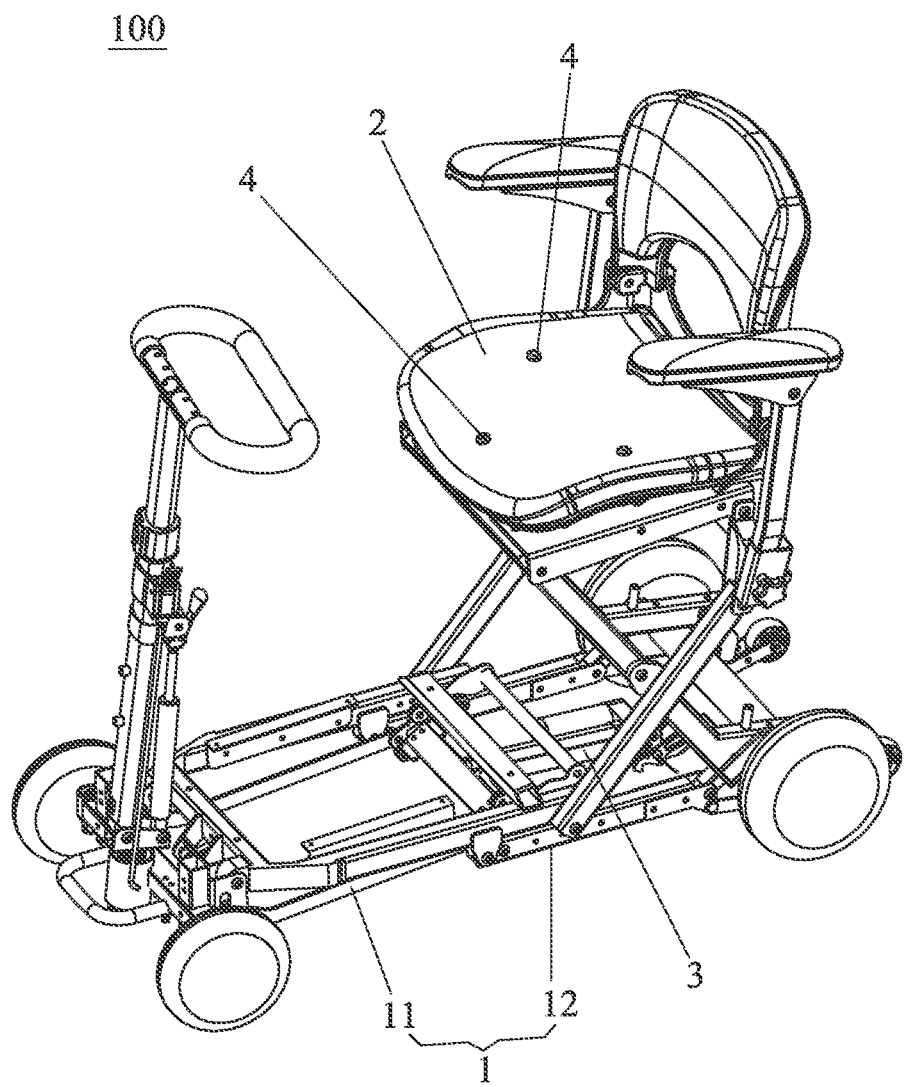
FIG. 1 is a perspective view of a sensing-enabled automatically foldable scooter frame according to one embodiment of the present invention.
Figure 2:
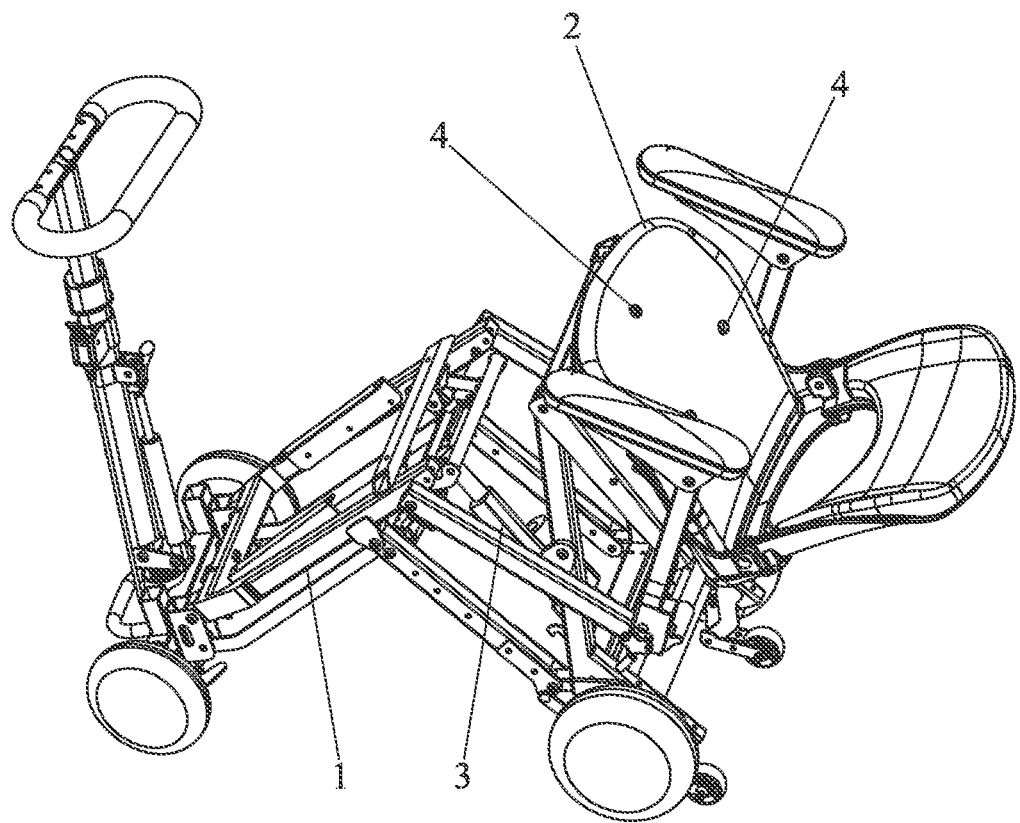
FIG. 2 is a perspective view of the sensing-enabled automatically foldable scooter frame in folded state.
Figure 3:
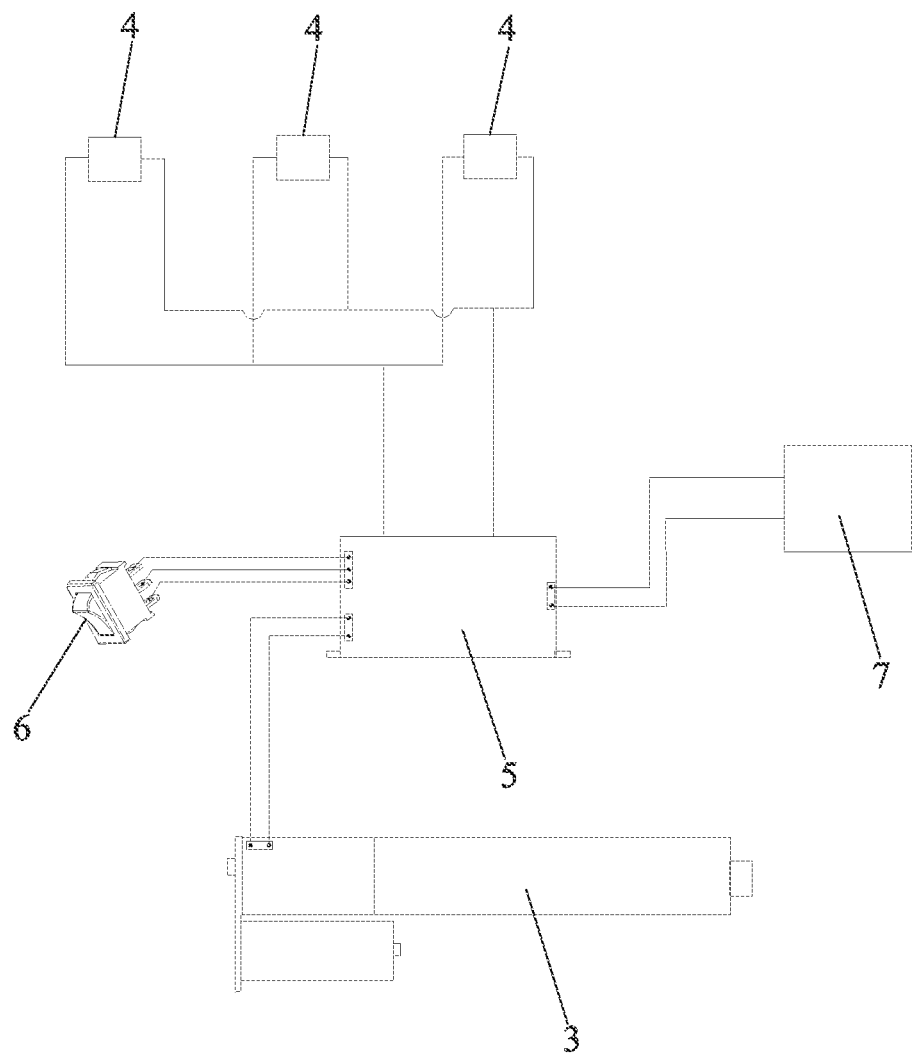
FIG. 3 is an electrical connection diagram of a sensor, a controller, and an operation device according to one embodiment of the present invention.

Referring to FIGS. 1-3, a sensing-enabled automatically foldable scooter frame 100 includes a support frame 1, a seat 2, an electric pushrod 3, a sensor 4, a controller 5, and an operation device 6. In this embodiment, the operation device 6 is a manual switch. Furthermore, the support frame 1 includes a front support frame 11 and a rear support frame 12. A rear end of the front frame 11 is pivotally connected to a front end of the rear frame 12, and the front frame 11 and the rear frame 12 are pivoted and close to each other to fold the support frame 1. Specifically, the seat 2 is set on the support frame 1 for a driver to ride, and the electric pushrod 3 on the support frame 1 drives the support frame 1 to fold or unfold. Furthermore, the sensor 4 is disposed on a surface of the seat 2 for detecting if someone is sitting on the surface of the seat 2, and the controller 5 receives a signal from the sensor 4 and control the electric pushrod 3 to extend or retract. The sensor 4 and the electric pushrod 3 are electrically connected to the controller 5, respectively. Furthermore, the controller 5 is electrically connected to the battery 7, the manual switch 6 is electrically connected to the controller 5 to manually control folding or unfolding of the support frame 1. When the sensor 4 detects pressure on the surface of the seat 2, the controller 5 makes the manual switch disabled, and the controller 5 controls the electric pushrod 3 to always keep in a retracted state, thereby ensuring the support frame 1 in an unfolded state. When no pressure on the surface of the seat 2 is detected by the sensor 4, the controller 5 makes the manual switch workable, and the controller 5 will drive the electric pushrod 3 to extend or retract by pressing a folding button or unfolding button on the manual switch 6, thereby making the electric push rod 3 to drive the support frame 1 to be folded or unfolded.

Preferably, the scooter frame 100 includes three sensors 4, one of which is disposed on the front region of the surface of the seat 2, and the other two are respectively disposed on the left and right regions of the surface of the seat 2. Specifically, any one of three sensors 4 that detects pressure can make the controller 5 to control the electric pushrod 3. Furthermore, the sensor 4 is a pressure sensor or other sensor that can detect if a driver is seated on the seat 2.

In comparison with the prior art, the sensor 4 is disposed on a surface of the seat 2 for detecting pressure on the surface of the seat 2, and the sensor 4 is electrically connected to the controller 5. The sensor 4 detects whether someone sits in the seat 2. When the seat 2 is seated, pressure signal from the surface on the seat 2 will be fed back to the controller 5, and then the controller 5 can keep the electric pushrod 3 in a retracted state. In this process, the operation device 6 is disabled, thereby preventing accidentally folding the scooter frame 100 and avoiding pinching a user. When the seat 2 is not seated, and no pressure on the surface of the seat is detected by the sensor 4, another pressure signal is fed back to the controller 5, so that the operation device 6 is enabled and the electric pushrod 3 can be controlled by the operation device 6 to drive the scooter frame 100 to be folded or unfolded, which is easy to use and safe.

In second embodiment, except for the operating device, structure of the sensing-enabled automatically foldable scooter frame 100 is the same as that of the first embodiment described above. In this embodiment, the operation device 6 is a remote operation device 6 including a remote control transmitter and a remote control receiver electrically connected to the controller 5, and the remote control receiver receives an instruction from the remote control transmitter and controls the electric pushrod 3 to start and stop.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A sensing-enabled automatically foldable scooter frame, comprising a support frame, a seat disposed on the support frame, and an electric pushrod arranged on the support frame for driving the support frame to fold or unfold;

characterized in that the scooter frame further comprises a sensor, a controller, and an operation device electrically connected to the controller, the sensor is provided at a surface of the seat for detecting pressure on the surface of the seat, and the controller is arranged to receive a signal from the sensor so as to control extension or retraction of the electric pushrod;

the operation device is a remote operation device comprising a remote control transmitter and a remote control receiver electrically connected to the controller, and the remote control receiver receives an instruction from the remote control transmitter and controls the electric pushrod to start and stop; and the operation device is disabled when the sensor detects pressure on the surface of the seat, and the controller controls the electric pushrod to always keep in a retracted state, thereby keeping the scooter frame in an unfolded state; and the operation device is enabled when no pressure on the surface of the seat is detected by the sensor, and the controller drives the electric pushrod to extend or retract by the operation device, thereby driving folding or unfolding of the scooter frame.

2. The sensing-enabled automatically foldable scooter frame according to claim 1, wherein the scooter frame comprises three sensors, one of which is disposed on the front region of the surface of the seat, and the other two are respectively disposed on the left and right regions of the surface of the seat.

3. The sensing-enabled automatically foldable scooter frame according to claim 2, wherein when any one of three sensors detects pressure, the controller will control the electric pushrod.

4. A sensing-enabled automatically foldable scooter frame, comprising a support frame, a seat disposed on the support frame, and an electric pushrod arranged on the support frame for driving the support frame to fold or unfold;

characterized in that the scooter frame further comprises a sensor, a controller, and an operation device electrically connected to the controller, the sensor is provided at a surface of the seat for detecting pressure on the surface of the seat, and the controller is arranged to receive a signal from the sensor so as to control extension or retraction of the electric pushrod; the scooter frame comprises three sensors, one of which is disposed on the front region of the surface of the seat, and the other two are respectively disposed on the left and right regions of the surface of the seat;

the operation device is a remote operation device comprising a remote control transmitter and a remote control receiver electrically connected to the controller, and the remote control receiver receives an instruction from the remote control transmitter and controls the electric pushrod to start and stop; and the operation device is disabled when the sensor detects pressure on the surface of the seat, and the controller controls the electric pushrod to always keep in a retracted state, thereby keeping the scooter frame in an unfolded state; and the operation device is enabled when no pressure on the surface of the seat is detected by the sensor, and the controller drives the electric pushrod to extend or retract by the operation device, thereby driving folding or unfolding of the scooter frame.

\* \* \* \* \*